(12) United States Patent
Handa et al.

(10) Patent No.: US 6,607,679 B2
(45) Date of Patent: Aug. 19, 2003

(54) ORGANIC PTC THERMISTOR

(75) Inventors: Tokuhiko Handa, Tokyo (JP); Yukie Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 141 days.

(21) Appl. No.: 09/758,291

(22) Filed: Jan. 12, 2001

(65) Prior Publication Data

US 2002/0093007 A1 Jul. 18, 2002

(51) Int. Cl.⁷ .............................. H01B 1/02; H01C 7/10
(52) U.S. Cl. .................. 252/513; 252/512; 252/500; 252/511; 252/518.1; 219/541; 219/546; 219/547; 219/553; 264/234; 264/104; 264/150; 264/347; 338/22 R
(58) Field of Search ................. 252/500, 511, 252/512, 513, 518.1; 219/541, 546, 547, 553; 264/104, 150, 234, 347; 338/22 R

(56) References Cited

U.S. PATENT DOCUMENTS 5,378,407 A * 1/1995 Chandler et al. ............ 252/513
5,945,034 A 8/1999 Handa et al.
5,982,271 A 11/1999 Handa
6,090,314 A 7/2000 Handa et al.
6,143,206 A 11/2000 Handa et al.

FOREIGN PATENT DOCUMENTS

| JP | 54-016697 | 2/1979 |
| JP | 63-279589 | 11/1988 |
| JP | 5-266974 | 10/1993 |
| JP | 8-138439 | 5/1996 |
| JP | 8-316005 | 11/1996 |
| JP | 10-334733 | 12/1998 |
| JP | 11-168005 | 6/1999 |

* cited by examiner

Primary Examiner—Yogendra N. Gupta
Assistant Examiner—D G Hamlin
(74) Attorney, Agent, or Firm—Oblon, Spivak, McClelland, Maier & Neustadt, P.C.

(57) ABSTRACT

In an organic PTC thermistor comprising a matrix of at least two high-molecular weight compounds, a low-molecular weight organic compound, and conductive particles having spiky protuberances, a thermoplastic elastomer is contained in the matrix whereby the thermistor is improved in reliability and performance stability.

15 Claims, 1 Drawing Sheet

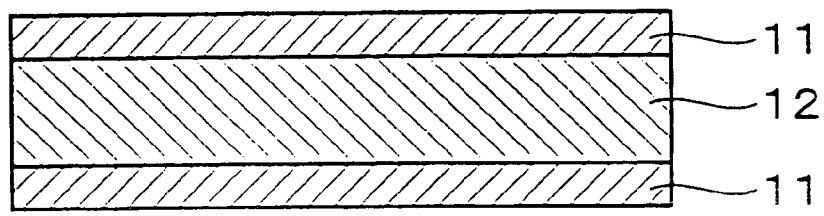

ORGANIC PTC THERMISTOR

BACKGROUND OF THE INVENTION

1. Field of the Invention

This invention relates to an organic positive temperature coefficient thermistor that is used as a temperature sensor or overcurrent-protecting element, and has positive temperature coefficient (PTC) of resistivity characteristics that its resistance value increases with increasing temperature.

2. Background Art

An organic positive temperature coefficient thermistor having conductive particles dispersed in a crystalline thermoplastic polymer is well known in the art, as disclosed in U.S. Pat. Nos. 3,243,753 and 3,351,882. The increase in the resistance value is believed to be due to the expansion of the crystalline polymer upon melting, which in turn cleaves a current-carrying path formed by the conductive fine particles.

An organic positive temperature coefficient thermistor can be used as a self-regulated heater, an overcurrent-protecting element, and a temperature sensor. Requirements for those are that the resistance value is sufficiently low at room temperature in a non-operating state, the rate of change between the room-temperature resistance value and the resistance value in operation is sufficiently large, and the resistance value change upon repetitive operations is reduced.

To meet such requirements, it has been proposed to incorporate a low-molecular weight organic compound such as wax in a thermoplastic polymer matrix serving as a binder. Such organic positive temperature coefficient thermistors, for instance, include a polyisobutylene/paraffin wax/carbon black system (F. Bueche, J. Appl. Phys., 44, 532, 1973), a styrene-butadiene rubber/paraffin wax/carbon black system (F. Bueche, J. Polymer Sci., 11, 1319, 1973), and a low-density polyethylene/paraffin wax/carbon black system (K. Ohe et al., Jpn. J. Appl. Phys., 10, 99, 1971). Self-regulated heaters, current-limiting elements, and other devices comprising an organic positive temperature coefficient thermistor using a low-molecular organic compound are also disclosed in JP-B 62-16523, JP-B 7-109786 and JP-B 7-48396, and JP-A 62-51184, JP-A 62-51185, JP-A 62-51186, JP-A 62-51187, JP-A 1-231284, JP-A 3-132001, JP-A 9-27383 and JP-A 9-69410. In these cases, the increase in the resistance value is believed to be due to the melting of the low-molecular organic compound.

One advantage associated with the use of the low-molecular weight organic compound is that there is a sharp rise in the resistance increase with increasing temperature because the low-molecular weight organic compound is generally higher in crystallinity than a polymer. A polymer, because of being easily put into an over-cooled state, shows a hysteresis where the temperature at which there is a resistance decrease with decreasing temperature is usually lower than the temperature at which there is a resistance increase with increasing temperature. The use of low-molecular organic compound can hold down this hysteresis. Further, a combination of low-molecular weight organic compounds having various melting points makes it possible to easily control the temperature (operating temperature) at which there is a resistance increase. A melting point of a polymer is susceptible to molecular weight and crystallinity, and its copolymerization with a comonomer, resulting in a change of operating temperature. Since this is accompanied by a variation in the crystal state, sufficient PTC characteristics are not always obtained. This is particularly true of the case where the operating temperature is set below 100° C.

However, the organic PTC thermistors disclosed in the above references, in which carbon black or graphite is used as the conductive particles, fail to find a good compromise between a high initial or room temperature resistance and a large resistance change rate. For instance, Jpn. J. Appl. Phys., vol. 10, P.99, 1971 shows an example wherein the resistivity ($\Omega$-cm) increased to $10^8$ $\Omega$-cm. However, its resistivity at room temperature is as high as $10^4$ $\Omega$-cm, indicating that the device is impractical for an overcurrent-protecting element or temperature sensor in particular. The other references show resistance ($\Omega$) or resistivity ($\Omega$-cm) increases in the range between $10^1$ times or lower and about $10^4$ times, while the room-temperature resistance is not fully low.

JP-A 5-47503 discloses an organic PTC thermistor comprising a crystalline polymer and conductive particles having spiky protuberances. Also, U.S. Pat. No. 5,378,407 discloses an organic PTC thermistor comprising filamentary nickel powders having spiky protuberances, and a crystalline polyolefin, olefin copolymer or fluoropolymer.

In these thermistors, the tradeoff between low initial resistance and a large resistance change is improved. However, they are still insufficient in terms of hysteresis, because low-molecular weight organic compounds are not used as the operating substance, and so are unsuitable for applications such as temperature sensors. They undesirably show negative temperature coefficient (NTC) of resistivity characteristics that the resistance value decreases with increasing temperature, when they are further heated after the resistance has once increased during operation. The use of low-molecular weight organic compounds is taught nowhere in the above references. In addition, most of these thermistors have an operating temperature of higher than 100° C. Although some thermistors have an operating temperature in the range of 60 to 70° C., they are impractical because their performance becomes unstable upon repetitive operations.

In JP-A 11-168005, the inventors proposed an organic PTC thermistor comprising a thermoplastic polymer matrix, a low-molecular weight organic compound, and conductive particles having spiky protuberances. This thermistor has a sufficiently low room-temperature resistivity of $8 \times 10^{-2}$ $\Omega$-cm or less, a rate of resistance change of eleven orders of magnitude or greater between an operating state and a non-operating state, and a reduced temperature vs. resistance curve hysteresis. In addition, the operating temperature is 40 to 100° C. By virtue of a good compromise between low room-temperature resistivity and a large resistance change as well as a low operating temperature, this thermistor is best suited as an overcurrent or overheat-protecting element for a secondary battery.

However, this thermistor was found to be insufficient in performance stability, which is probably ascribable to the low melting point and low melt viscosity of the low-molecular weight organic compound. The probable cause is that melting and solidification alternately occur during the operation and restoration of the device, which invites changes in the crystalline and dispersion states. Especially in a hot humid accelerated test and cyclic load test, outstanding increases of resistance developed.

The above-referred U.S. Pat. No. 5,378,407 describes that the crystalline polyolefin, olefin copolymer or fluoropolymer may be further blended with an elastomer, amorphous thermoplastic polymer or another crystalline polymer. However, specific examples and benefits of this blending are not disclosed. JP-A 54-16697 discloses a PTC composition comprising a polymer component of at least two crystalline thermoplastic polymers having separate melting points, and an elastomer, in which only carbon black is used as the conductive particles. This composition fails to exhibit both a low room-temperature resistance and a large resistance change. No reference is made to the reliability against thermal shock test or the use of low-molecular weight organic compounds.

Additionally, JP-A 63-279589, JP-A 5-266974, JP-A 8-138439, JP-A 8-316005, and JP-A 10-334733 disclose PTC compositions comprising elastomers. No reference is made to conductive particles having spiky protuberances and low-molecular weight organic compounds. Therefore, these compositions fail to exhibit both a low room-temperature resistance and a large resistance change.

SUMMARY OF THE INVENTION

An object of the invention is to provide an organic PTC thermistor having improved reliability and performance stability.

The invention provides an organic positive temperature coefficient (PTC) thermistor comprising a matrix of at least two polymers, a low-molecular weight organic compound, and conductive particles having spiky protuberances, wherein the matrix contains a thermoplastic elastomer.

In one preferred embodiment, the matrix contains 2 to 60% by weight of the thermoplastic elastomer, based on the entire weight of the matrix. The low-molecular weight organic compound preferably has a melting point of 40° C. to 200° C. The low-molecular weight organic compound is preferably segregated in the matrix. Desirably the conductive particles are interconnected in chain-like network.

In a typical application, the thermistor constitutes a protective circuit device for a secondary battery.

The organic PTC thermistor of the invention comprises a polymer matrix, a low-molecular weight organic compound, and conductive particles having spiky protuberances. The spiky shape of protuberances on the conductive particles enables a tunnel current to pass readily through the thermistor, and makes it possible to obtain a room temperature resistance lower than would be possible with spherical conductive particles. A greater spacing between protuberant particles than between spherical particles allows for a large resistance change during operation of the thermistor.

In the present invention, the low-molecular weight organic compound is incorporated in the polymer matrix so that the resistance is increased by expansion due to melting of the low-molecular weight organic compound. Accordingly, the temperature vs. resistance curve hysteresis can be reduced as compared with the operation based on the melting of crystalline polymer. Control of the operating temperature becomes easy when low-molecular weight organic compounds having various melting points are used.

The polymer matrix used herein is composed of a plurality of polymers. Using a thermoplastic elastomer as part of the polymer matrix, the device is further improved in long-term durability. The polymer matrix is effective for preventing the device from being deformed when the low-molecular weight organic compound having a low melt viscosity melts during operation. Using a thermoplastic elastomer as one component of the polymer matrix, the device is improved in thermal shock resistance and maintains a low room-temperature resistance and a large resistance change in a stable manner over a long term.

BRIEF DESCRIPTION OF THE DRAWING

The only FIGURE, FIG. 1 is a schematic cross-section showing the basic construction of an organic PTC thermistor according to the invention.

DESCRIPTION OF THE PREFERRED EMBODIMENTS

Briefly stated, the organic PTC thermistor of the invention includes a matrix containing at least two polymers (matrix being often referred to as polymer matrix), a low-molecular weight organic compound, and conductive particles having spiky protuberances. The matrix contains a thermoplastic elastomer.

Several advantages arise from the use of a thermoplastic elastomer in the polymer matrix.

The low molecular weight organic compound readily flows due to a very low melt viscosity. If current conduction is continued even after the resistance has increased at the operating temperature, it causes conductive particles to rearrange in the matrix to give rise to the NTC phenomenon that the once increased resistance declines. As a result, the temperature at which there is a resistance decrease with decreasing temperature can become higher than the temperature at which there is a resistance increase with increasing temperature. This is true particularly when a thermoplastic polymer having a high melting point such as high density polyethylene is solely used as the matrix.

On the other hand, if a polymer having a relatively approximate melting temperature to the melting point of the low-molecular weight organic compound, such as polyolefin with low melting point is used as the matrix, it begins to melt immediately after the low-molecular weight organic compound has melted. This enables to increase the viscosity of the molten component and restrain rearrangement of conductive particles, eliminating the above-mentioned drawback. Upon repetition of operation, however, a significant increase of room-temperature resistance is observed. When the low-melting polyolefin is subject to operation with the molten low-molecular weight organic compound, the polyolefin partially melts because of its close melting point to that of the low-molecular weight organic compound. The low-melting polyolefin, which contains many side chains or is a copolymer, takes a long time for crystallization as compared with homopolymers having no side chains. Then, in the process of melting followed by solidification, the low-melting polyolefin cannot be fully crystallized and the overall system remains expanded containing more amorphous portions. As a consequence, the room temperature resistance gradually increases as operation is repeated.

The inventors discovered that the above-described drawback associated with the use of one thermoplastic polymer can be eliminated by using a matrix of at least two polymers having various melting points, specifically a first thermoplastic polymer having a relatively low melting point, but higher than the low-molecular weight organic compound and a second thermoplastic polymer having a higher melting point than the first polymer.

It was found that the above construction is still insufficient in performance stability. In particular, substantial degradation was observed in a thermal shock test of repetitive rapid thermal expansion and contraction cycles. It has been found that this drawback is dramatically eliminated by using a thermoplastic elastomer as part of the polymer matrix to endow the matrix with appropriate elasticity.

Polymer matrix

The thermoplastic elastomers are high-molecular weight compounds which undergo elastic deformation at room temperature and plastic deformation at elevated temperature. They have within their molecular structure soft blocks exhibiting rubber-like elastic deformation and hard blocks exhibiting plastic deformation at elevated temperature, which are block or graft copolymerized. Some elastomers are blends of a soft rubber component with a hard resin. Illustrative examples of the thermoplastic elastomer include polyolefins, polystyrenes, polyurethanes, polyamides, fluoropolymers, and ionomers, with the polyolefins and polystyrenes being especially preferred. Desirably the melting point of the thermoplastic elastomer is at least 10° C. higher than the melting point of the low-molecular weight organic compound. Specifically, the thermoplastic elastomer has a melting point of about 100° C. to about 180° C.

The melt viscosity or melt flow rate (MFR) of the thermoplastic elastomer is not critical. Included are thermoplastic elastomers having a MFR of about 0.1 to 50 g/10 min as measured at 230° C. and under a load of 2.16 kg, to thermoplastic elastomers having a MFR of about 5 to 50 g/10 min as measured at 230° C. and under a load of 10 kg.

Typical thermoplastic elastomers are olefin elastomers whose hard segment comprises polypropylene, polyethylene or the like and whose soft segment comprises polybutadiene, polyisoprene, hydrogenated polybutadiene, hydrogenated polyisoprene, EPDM or the like. Blends of these components and crosslinked such blends are also included.

Also useful are styrene elastomers whose hard segment comprises polystyrene or the like and whose soft segment comprises polybutadiene, polyisoprene, hydrogenated polybutadiene, hydrogenated polyisoprene, EPDM or the like, which are block copolymerized. These styrene thermoplastic elastomers take a microscopically phase separated structure because both the segments are incompatible. If the polymer matrix and the low-molecular weight organic compound are selected in consideration of compatibility, the low-molecular weight organic compound which is otherwise likely to flow in the molten state can be segregated and fixed within the polymer matrix, achieving the effect of improving long-term reliability. In one example using polystyrene along with styrene elastomer and hydrocarbon wax as the low-molecular weight organic compound, the wax can be selectively dispersed in the elastic soft segment of the styrene elastomer.

Of the foregoing elastomers, olefin elastomers such as polypropylene-EPDM elastomers and styrene elastomers such as hydrogenated polyisoprene elastomers are especially preferred.

An appropriate amount of the thermoplastic elastomer blended is about 2 to about 60% by weight, especially about 5% to about 40% by weight based on the total weight of the matrix.

The other polymer(s) in the matrix may be either thermoplastic or thermosetting. Exemplary thermoplastic polymers are polyolefins such as polyethylene, olefin copolymers such as ethylene-vinyl acetate copolymers and ethylene acrylic acid copolymers, halogenated polymers, polyamides, polystyrene, polyacrylonitrile, polyethylene oxide, polyacetals, thermoplastic modified celluloses, polysulfone, thermoplastic polyesters such as polyethylene terephthalate (PET), poly(ethyl acrylate), and poly(methyl methacrylate).

Illustrative examples include high-density polyethylene such as Hizex 2100JP by Mitsui Chemical Co., Ltd., Marlex 6003 made by Phillips Co., and HY540 by Nippon Polychem Co., Ltd; low-density polyethylene such as LC500 made by Nippon Polychem Co., Ltd., and DYNH-1 made by Union Carbide Corp.; medium-density polyethylene such as 2604M made by Gulf Oil Corp.; ethylene-ethyl acrylate copolymers such as DPD6169 made by Union Carbide Corp.; ethylene-vinyl acetate copolymers such as LV241 made by Nippon Polychem Co., Ltd.; ethylene-acrylic acid copolymers such as EAA455 by Dow Chemical; ionomers such as Himilan 1555 by Dupont-Mitsui Polychemical Co., Ltd.; polyvinylidene fluoride such as Kynar 461 by Elf Atochem; and vinylidene fluoride-tetrafluoroethylene-hexafluoropropylene copolymers such as Kynar ADS by Elf Atochem.

Of these, polyolefins are preferred, with polyethylene being especially preferred. High density, linear low density and low density grades of polyethylene are useful although high density and linear low density polyethylenes are preferred. Their melt flow rate (MFR) as measured above should preferably be 15 g/10 min or lower, and more preferably 8 g/10 min or lower. Their melting point should desirably be at least 10° C. higher than that of the low-molecular weight compound so that the device is prevented from thermal deformation.

The thermosetting polymer used as the matrix is not critical although epoxy resins, unsaturated polyester resins, polyimides, polyurethane, phenolic resins, and silicone resins are preferred.

The epoxy resins are oligomers terminated with reactive epoxy groups (having a molecular weight of several hundreds to about ten thousand) which are cured or crosslinked with curing agents. The epoxy resins are divided into glycidyl ether type as typified by bisphenol A, glycidyl ester type, glycidyl amine type and alicyclic type. In a particular application, tri or polyfunctional epoxy resins may also be used. Of these, glycidyl ether type epoxy resins, especially bisphenol A type epoxy resins are preferred in the practice of the invention. The epoxy resins used herein preferably have an epoxy equivalent of about 100 to about 500. The curing agents are divided into polyaddition type, catalyst type and condensation type, depending on the reaction mechanism. The polyaddition type curing agents themselves add to epoxy or hydroxyl groups and include polyamines, acid anhydrides, polyphenols, polymercaptans, and isocyanates. The catalyst type curing agents promote polymerization between epoxy groups and include tertiary amines and imidazoles. The condensation type curing agents effect curing through condensation with hydroxyl groups and include phenolic resins and melamine resins. For the curing of bisphenol A type epoxy resins, polyaddition type curing agents, especially polyamines and acid anhydrides are preferred. Curing conditions may be properly determined.

These epoxy resins and curing agents are commercially available. An exemplary epoxy resin is Epikote by Yuka Shell Epoxy Co., Ltd. Exemplary curing agents are Epicure and Epomate by Yuka Shell Epoxy Co., Ltd. and Araldite by Ciba-Geigy.

The unsaturated polyester resins are polyesters based on an unsaturated dibasic acid or a dibasic acid and a polyhydric alcohol (having a molecular weight of about 1,000 to about 5,000) which are dissolved in vinyl monomers serving for crosslinking. They are cured using organic peroxides such as benzoyl peroxide as the polymerization initiator. If necessary, polymerization promoters may be used. Of the starting reactants from which the unsaturated polyester is prepared, preferred unsaturated dibasic acids are maleic anhydride and fumaric acid; preferred dibasic acids are phthalic anhydride, isophthalic acid, and terephthalic acid; and preferred polyhydric alcohols are propylene glycol and ethylene glycol. Preferred vinyl monomers are styrene, diallyl phthalate, and vinyl toluene. The amount of vinyl monomer blended is determined as appropriate and usually ranges from about 1.0 to 3.0 moles per mole of fumaric acid residue. Any of well-known polymerization inhibitors such as quinones and hydroquinones may be added for the purpose of preventing gelation during the synthesis process and tailoring curing properties. Curing conditions may be properly determined.

These unsaturated polyester resins are commercially available, for example, under the trade name of Epolac from Nippon Catalyst Co., Ltd., Polyset from Hitachi Chemicals Co., Ltd. and Polylite from Dainippon Ink Chemical Co., Ltd.

The polyimides are generally divided into the condensation type and the addition type, although bismaleimide type polyimides belonging to the addition polymerization type are preferred. The bismaleimide type polyimides can be cured by utilizing homopolymerization, reaction with other unsaturated bonds, Michael addition reaction with aromatic amines, or Diels-Alder reaction with dienes. In the practice of the invention, bismaleimide type polyimides resulting from addition reaction of bismaleimides to aromatic diamines are preferred. Diaminodiphenylmethane is a typical aromatic diamine. Synthesis and curing conditions may be determined as appropriate.

These polyimides are commercially available, for example, under the trade name of Imidaloy from Toshiba Chemical Co., Ltd. and Chelimide from Ciba-Geigy.

The polyurethane is produced by polyaddition reaction between a polyisocyanate and a polyol. The polyisocyanates include aromatic and aliphatic ones, with the aromatic ones being preferred. Useful examples are 2,4- and 2,6-tolylene diisocyanate, diphenylmethane diisocyanate and naphthalene diisocyanate. Exemplary polyols include polyether polyols such as polypropylene glycol, polyester polyols and acrylic polyols, with the polypropylene glycol being preferred. Amine catalysts such as tertiary amines (e.g., triethylene diamine) and amine salts may be used although organic metal compounds such as dibutyltin dilaurate and stannous octoate are useful catalysts. Crosslinking agents such as polyhydric alcohols and polyfunctional amines may be used as an adjuvant in combination. Synthesis and curing conditions may be determined as appropriate.

Such polyurethane is commercially available, for example, under the trade name of Sumidure from Bayer-Sumitomo Urethane Co., Ltd., NP series from Mitsui Toatsu Chemical Co., Ltd. and Colonate from Nippon Polyurethane Co., Ltd.

The phenolic resins are produced by reacting phenols with aldehydes such as formaldehyde. They are divided into novolac and resole types depending on synthesis conditions. The novolac type phenol resins are produced in the presence of acidic catalysts and cured by heating in the presence of crosslinking agents such as hexamethylene tetramine. The resole type phenol resins are produced in the presence of basic catalysts and cured by heating them alone or in the presence of acid catalysts. Either of these phenolic resins may be used in the practice of the invention. Synthesis and curing conditions may be determined as appropriate.

Such phenolic resins are commercially available, for example, under the trade name of Sumicon from Sumitomo Bakelite Co., Ltd., Standlite from Hitachi Chemicals Co., Ltd. and Tecolite from Toshiba Chemical Co., Ltd.

The silicone resins include those comprising recurring siloxane bonds and resulting from hydrolysis or polycondensation of organohalosilanes; modified silicone resins such as alkyd, polyester, acrylic, epoxy, phenol, urethane and melamine-modified silicone resins; silicone rubbers obtained by crosslinking linear polydimethylsiloxane or a copolymer thereof with organic peroxide or other crosslinkers; and room temperature vulcanizable (RTV) silicone rubbers of the condensation and addition types.

Such silicone resins or rubbers are commercially available, for example, from Shin-Etsu Chemical Co., Ltd., Dow Corning-Toray Co., Ltd., and Toshiba Silicone Co., Ltd.

Any appropriate one may be selected from the above-mentioned thermosetting resins, depending on the desired characteristics and application. Inter alia, epoxy resins and unsaturated polyester resins are preferred. Also acceptable is a mixture of two or more such resins which can be reacted into a polymer.

When a thermosetting polymer and a thermoplastic polymer are used together in the matrix, the weight ratio of thermosetting polymer to thermoplastic polymer preferably ranges from 1:5 to 9:1, and especially from 1:4 to 8:1. A larger amount of the thermoplastic polymer tends to reduce the stability of initial resistance. A smaller amount of the thermoplastic polymer tends to exacerbate the stability under hot humid conditions.

Low-molecular weight organic compound

The low-molecular weight organic compound used herein is not critical as long as it is a crystalline substance having a molecular weight of less than about 2,000, preferably less than about 1,000, and more preferably about 200 to 800. Preferably it is solid at room temperature (about 25° C.).

Such low-molecular weight organic compounds, for instance, include waxes (e.g., petroleum waxes such as paraffin wax and microcrystalline wax as well as natural waxes such as vegetable waxes, animal waxes and mineral waxes), and fats and oils (e.g., fats and those called solid fats). Actual components of the waxes, fats and oils are hydrocarbons (e.g., alkane series straight-chain hydrocarbons having 22 or more carbon atoms), fatty acids (e.g., fatty acids of alkane series straight-chain hydrocarbons having 12 or more carbon atoms), fatty esters (e.g., alkyl esters of saturated fatty acids obtained from saturated fatty acids having 20 or more carbon atoms and lower alcohols such as methyl alcohol), fatty amides (e.g., unsaturated fatty amides such as oleic amide and erucic amide), aliphatic amines (e.g., aliphatic primary amines having 16 or more carbon atoms), higher alcohols (e.g., n-alkyl alcohols having 16 or more carbon atoms), and chlorinated paraffin. These components may be used alone or in admixture as the low-molecular weight organic compound. The low-molecular weight organic compound may be selected as appropriate to help disperse the other ingredients in the polymer matrix while taking into account the polarity of the polymer matrix. The preferred low-molecular weight organic compounds are petroleum waxes.

These low-molecular weight organic compounds are commercially available, and commercial products may be used as such.

Since the invention is intended to provide a thermistor that can operate preferably up to 200° C., more preferably up to 100° C., the low-molecular weight organic compound used herein should preferably have a melting point (mp) of 40 to 200° C., more preferably 40 to 100° C. Such low-molecular weight organic compounds, for instance, include paraffin waxes, for example, tetracosane $C_{24}H_{50}$ (mp 49–52° C.) and hexatriacontane $C_{36}H_{74}$ (mp 73° C.), HNP-10 (mp 75° C.) and HNP-3 (mp 66° C.) both from Nippon Seiro Co., Ltd.; microcrystalline waxes, for example, Hi-Mic-1080 (mp 83° C.), Hi-Mic-1045 (mp 70° C.), Hi-Mic-2045 (mp 64° C.) and Hi-Mic-3090 (mp 89° C.), all from Nippon Seiro Co., Ltd., Seratta 104 (mp 96° C.) from Nippon Sekiyu Seisei Co., Ltd., and 155 Microwax (mp 70° C.) from Nippon Sekiyu Seisei Co., Ltd.; fatty acids, for example, behenic acid (mp 81° C.), stearic acid (mp 72° C.) and palmitic acid (mp 64° C.), all from Nippon Seika Co., Ltd.; fatty esters, for example, methyl arachidate (mp 48° C.) from Tokyo Kasei Co., Ltd.); and fatty amides, for example, oleic amide (mp 76° C.) from Nippon Seika Co., Ltd. Also included are polyethylene waxes such as Mitsui Hiwax 110 (mp 100° C.) from Mitsui Chemical Co., Ltd.; stearic amide (mp 109° C.), behenic amide (mp 111° C.), N,N'-ethylenebislauric amide (mp 157° C.), N,N'-dioleyl-adipic amide (mp 119° C.), and N,N'-hexamethylenebis-12-hydroxystearic amide (mp 140° C.). Use may also be made of wax blends of a paraffin wax with a resin and such wax blends having microcrystalline wax further blended therein so as to give a melting point of 40° C. to 200° C.

The low-molecular weight organic compounds may be used alone or in combination of two or more, depending on the operating temperature and other factors.

An appropriate amount of the low-molecular weight organic compound is 0.1 to 4.0 times, preferably 0.2 to 2.5 times the total weight of the polymer matrix (inclusive of curing agent and additives). Outside the range, a less content of the low-molecular weight organic compound may fail to provide a satisfactory resistance change rate whereas a larger content of the low-molecular weight organic compound may cause the thermistor element to be deformed upon melting thereof and become awkward to mix with conductive particles.

When analyzed by differential scanning calorimetry (DSC), the organic PTC thermistor of the invention exhibits endothermic peaks in proximity to the melting points of the respective matrix thermoplastic polymers and the melting point of the low-molecular weight organic compound. This suggests that the thermoplastic polymer with high-melting point, thermoplastic polymer with low-melting point and low-molecular organic compound, or the thermosetting polymer, thermoplastic polymer and low-molecular organic compound form an islands-sea structure in which the respective components are independently dispersed.

Conductive particles

The conductive particles having spiky protuberances as used herein are primary particles having pointed protuberances. More specifically, one particle bears a plurality of, usually 10 to 500, conical and spiky protuberances having a height of ⅓ to ⅟₅₀ of the particle diameter. The conductive particles are preferably made of a metal, typically nickel.

Although the conductive particles may be used in a powder form consisting of discrete particles, it is preferable that about 10 to 1,000 primary particles be interconnected in chain-like network to form a secondary particle. The chain form of particles does not exclude the partial presence of discrete primary particles. Examples of the former include a powder of spherical nickel particles having spiky protuberances, which is commercially available under the trade name of INCO Type 123 Nickel Powder (INCO Ltd.). The powder preferably has an average particle diameter of about 3 to 7 μm, an apparent density of about 1.8 to 2.7 $g/cm^3$, and a specific surface area of about 0.34 to 0.44 $m^2/g$.

Preferred examples of the chain-like network nickel powder are filamentary nickel powders, which are commercially available under the trade name of INCO Type 210, 255, 270 and 287 Nickel Powders from INCO Ltd. Of these, INCO Type 210 and 255 Nickel Powders are preferred. The primary particles therein preferably have an average particle diameter of preferably at least 0.1 μm, and more preferably from about 0.2 to about 4.0 μm. Most preferred are primary particles having an average particle diameter of 0.4 to 3.0 μm, in which may be mixed less than 50% by weight of primary particles having an average particle diameter of 0.1 μm to less than 0.4 μm. The apparent density is about 0.3 to 1.0 $g/cm^3$ and the specific surface area is about 0.4 to 2.5 $m^2/g$.

It is to be noted that the average particle diameter is measured by the Fischer subsieve method.

Such conductive particles are set forth in JP-A 5-47503 and U.S. Pat. No. 5,378,407.

In addition to the conductive particles having spiky protuberances, it is acceptable to use auxiliary conductive particles capable of imparting electric conductivity, for example, carbonaceous conductive particles such as carbon black, graphite, carbon fibers, metallized carbon black, graphitized carbon black and metallized carbon fibers, spherical, flaky or fibrous metal particles, metal particles coated with a different metal (e.g., silver-coated nickel particles), and ceramic conductive particles such as tungsten carbide, titanium nitride, zirconium nitride, titanium carbide, titanium boride and molybdenum silicide, as well as conductive potassium titanate whiskers as disclosed in JP-A 8-31554 and JP-A 9-27383. The amount of auxiliary conductive particles should preferably be up to 25% by weight based on the weight of the conductive particles having spiky protuberances.

The amount of the conductive particles should preferably be 1.5 to 8 times as large as the total weight of the polymer matrix and low-molecular organic compound (the total weight of organic components inclusive of curing agent and other additives). If this mixing ratio becomes low or the amount of the conductive particles becomes small, it may be difficult to make the room-temperature resistance in a non-operating state sufficiently low. If the amount of the conductive particles becomes large, on the contrary, it may become difficult to obtain a high rate of resistance change and to achieve uniform mixing, failing to provide stable properties.

It is now described how to prepare the organic PTC thermistor of the invention.

First, the matrix thermoplastic polymer, thermoplastic elastomer, low-molecular weight organic compound, and conductive particles are mixed or milled by any of well-known techniques. In the event where the matrices consist of thermoplastic polymers only, milling may be done in a well-known mill or roll for about 5 to 90 minutes at a temperature which is higher, preferably about 5 to 40° C. higher than the highest melting point of a thermoplastic polymer among other thermoplastic polymers excluding the thermoplastic elastomer. With respect to the thermoplastic elastomer, even if the melting point of the thermoplastic elastomer is higher than the highest melting point of the thermoplastic polymer, it is unnecessary to completely melt the thermoplastic elastomer by heating above its melting point, because the thermoplastic elastomer remains relatively soft even at temperatures below its melting point. Note that this discussion depends on the amount of the thermoplastic elastomer blended. To prevent any thermal degradation, it is recommended that mixing be done at as low a temperature as possible which enables milling and is higher than the melting point of the thermoplastic polymers excluding the elastomer. Alternatively, the matrix polymers and low-molecular weight organic compound are premixed in a molten state or dissolved in a solvent before mixing.

When the thermoplastic polymer, thermoplastic elastomer, low-molecular weight organic compound and conductive particles are mixed by the solution process, a solvent in which at least one of the thermoplastic polymer, thermoplastic elastomer, and low-molecular weight organic compound is dissolvable is selected and the remainder of them are dispersed in the solution along with the conductive particles.

The milled mixture is press molded into a sheet having a predetermined thickness. Molding may be casting or extrusion instead of press molding. After molding, the sheet may be crosslinked if desired. Possible crosslinking methods include radiation crosslinking, chemical crosslinking with organic peroxides, and water crosslinking including grafting silane coupling agents to effect condensation reaction of silanol groups, with the water crosslinking method being preferred. Finally, electrodes are formed on the sheet by heat pressing metal electrodes of Cu or Ni or applying a conductive paste, completing a thermistor device. It is possible to carry out press molding and electrode formation at the same time.

In one preferred embodiment of the invention, a mixture of a thermoplastic polymer matrix, a low-molecular weight organic compound and conductive particles is crosslinked with a silane coupling agent having a vinyl or (meth) acryloyl group and an alkoxy group. This helps the thermistor body maintain more stable performance even after shelf storage and repetitive operations.

The performance stability improvement of the organic PTC thermistor appears to be due to a crosslinked structure of the polymer matrix and the low-molecular weight organic compound, which allows the polymer matrix to ensure shape retention, thereby suppressing the agglomeration and segregation of the low-molecular weight organic compound exposed to repetitive melting/solidification cycles during operation. The coupling agent appears not only to crosslink the above organic matrix, but also to form chemical bonds between the organic and inorganic materials, producing a significant effect on the modification of the interface therebetween. The treatment of the mixture of the polymer matrix, low-molecular weight organic compound and conductive particles with the silane coupling agent contributes to additional performance stability improvements because there is an increase in the strength of the polymer matrix/ conductive particle interface, low-molecular weight organic compound/conductive particle interface, polymer matrix/ metal electrode interface, low-molecular weight organic compound/metal electrode interface, and low-melting polymer/high-melting polymer interface.

First, the coupling agent is grafted onto the polymer matrix and low-molecular weight organic compound via groups having a carbon-to-carbon double bond (C=C). This is followed by alcohol removal in the presence of water and condensation with dehydration. Crosslinking reactions occur according to the following scheme.

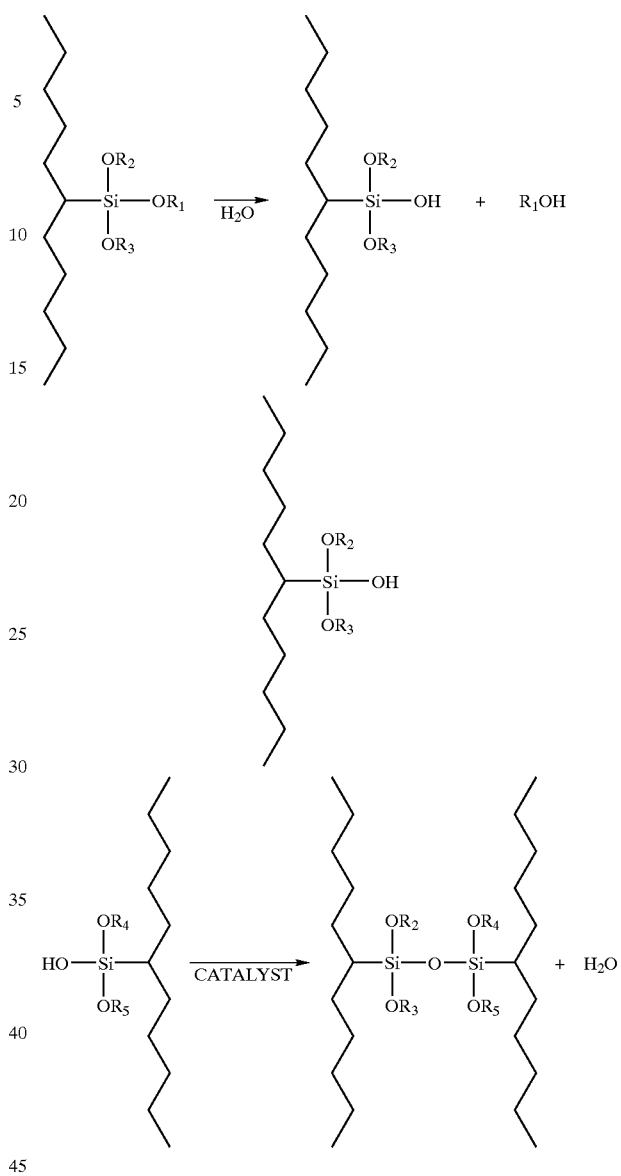

The silane coupling agent enables condensation through alcohol removal and dehydration, and thus have per molecule an alkoxy group chemically bondable to an inorganic oxide and a vinyl group or (meth)acryloyl group having an affinity or chemically bondable to an organic material. Preferred silane coupling agents are trialkoxysilanes having a C=C bond. Alkoxy groups having a smaller number of carbon atoms are preferred, with methoxy and ethoxy groups being especially preferred. The C=C bond-containing group is a vinyl group or a (meth)acryloyl group, with the vinyl group being preferred. These groups may be bonded to Si either directly or via a $C_{1-3}$ carbon chain.

Preferred silane coupling agents are liquid at room temperature. Exemplary silane coupling agents are vinyltrimethoxysilane, vinyltriethoxysilane, vinyl-tris(β-methoxyethoxy)silane, γ-(meth)acryloxypropyltrimethoxy-silane, γ-(meth) acryloxypropyltriethoxysilane, γ-(meth) acryloxypropylmethyldimethoxysilane and γ-(meth) acryloxypropylmethyldiethoxysilane, with vinyltrimethoxysilane and vinyltriethoxysilane being most preferred.

For the coupling treatment, the silane coupling agent is added dropwise to a milled mixture of the polymer matrix, low-molecular weight organic compound and conductive particles, in an amount of 0.1 to 5% by weight based on the weight of the thermoplastic polymer and low-molecular weight organic compound combined. This is followed by full stirring and water crosslinking. If the amount of the coupling agent is smaller than 0.1%, the crosslinking treatment may become less effective. More than 5% of the coupling agent may bring no further increase in the effect. When the silane coupling agent having a vinyl group is used, an organic peroxide such as 2,2-di-(t-butylperoxy)butane, dicumyl peroxide or 1,1-di-t-butylperoxy-3,3,5-trimethylcyclohexane is incorporated in the coupling agent in an amount of 5 to 20% by weight thereof for grafting onto the organic materials, i.e., the thermoplastic polymer and low-molecular organic compound via the vinyl group. The addition of the silane coupling agent is carried out after the thermoplastic polymer, low-molecular organic compound and conductive particles have been milled together in a sufficiently uniform state.

After the milled mixture is press molded into a sheet, crosslinking treatment is effected in the presence of water. For instance, the molded sheet is immersed in warm water for 6 to 8 hours, using as a catalyst a metal carboxylate such as dibutyltin dilaurate, dioctyltin dilaurate, tin acetate, tin octoate or zinc octoate. Alternatively, the catalyst is milled with the thermistor-forming composition whereupon crosslinking is carried out at high temperature and humidity. For the catalyst it is particularly preferable to use dibutyltin dilaurate. Preferably, the crosslinking temperature should be equal to or less than the melting point of the low-molecular organic compound to enhance performance stability upon repetitive operations, etc. After completion of the crosslinking treatment, the molded part is dried, and metal electrodes of Cu or Ni is heat pressed thereto or a conductive paste is applied thereto, completing a thermistor device.

In the embodiment where the thermosetting polymer is used in the matrix, predetermined amounts of the (uncured) thermosetting polymer, thermoplastic elastomer, low-molecular organic compound and conductive particles having spiky protuberances are mixed and dispersed into a paint. The mixing and dispersion may be done by well-known techniques using a customary agitator, dispersing machine, stirrer or paint roll mill. If air is introduced during the mixing step, the paint is deaerated in vacuum. Various solvents such as aromatic hydrocarbons, ketones, and alcohols may be used for viscosity adjustment. The paint is cast between metal foil electrodes of nickel or copper. Alternatively, the paint is applied by screen printing or similar technique, to form a sheet, which is cured under appropriate heating conditions for the thermosetting resin. In an alternative process, the sheet is precured at a relatively low temperature before it is cured at a high temperature. To the cured sheet of the mixture, a conductive paste is applied to form electrodes. The resulting sheet is punched into a desired shape, obtaining a thermistor device.

To prevent thermal degradation of the matrix polymers and low-molecular organic compound, an antioxidant may also be incorporated. Typically phenols, organic sulfurs, and phosphates are used as the antioxidant.

Additionally, there may be added a good thermal conductive additive, for example, silicon nitride, silica, alumina and clay (mica, talc, etc.) as described in JP-A 57-12061, silicon, silicon carbide, silicon nitride, beryllia and selenium as described in JP-B 7-77161, inorganic nitrides and magnesium oxide as described in JP-A 5-217711.

For durability improvements, there may be added titanium oxide, iron oxide, zinc oxide, silica, magnesium oxide, alumina, chromium oxide, barium sulfate, calcium carbonate, calcium hydroxide and lead oxide as described in JP-A 5-226112, and inorganic solids having a high relative dielectric constant such as barium titanate, strontium titanate and potassium niobate as described in JP-A 6-68963.

For withstand voltage improvements, boron carbide as described in JP-A 4-74383 may be added.

For strength improvements, there may be added hydrated alkali titanates as described in JP-A 5-74603, and titanium oxide, iron oxide, zinc oxide and silica as described in JP-A 8-17563.

There may be added a crystal nucleator, for example, alkali halides and melamine resin as described in JP-B 59-10553, benzoic acid, dibenzylidenesorbitol and metal benzoates as described in JP-A 6-76511, talc, zeolite and dibenzylidenesorbitol as described in JP-A 7-6864, and sorbitol derivatives (gelling agents), asphalt and sodium bis(4-t-butylphenyl) phosphate as described in JP-A 7-263127.

As an arc-controlling agent, there may be added alumina and magnesia hydrate as described in JP-B 4-28744, metal hydrates and silicon carbide as described in JP-A 61-250058.

For preventing the harmful effects of metals, there may be added Irganox MD1024 (Ciba-Geigy) as described in JP-A 7-6864, etc.

As a flame retardant, there may be added diantimony trioxide and aluminum hydroxide as described in JP-A 61-239581, magnesium hydroxide as described in JP-A 5-74603, as well as halogen-containing organic compounds (including polymers) such as 2,2-bis(4-hydroxy-3,5-dibromophenyl)propane and polyvinylidene fluoride (PVDF) and phosphorus compounds such as ammonium phosphate.

In addition to these additives, the thermistor of the invention may contain zinc sulfide, basic magnesium carbonate, aluminum oxide, calcium silicate, magnesium silicate, aluminosilicate clay (mica, talc, kaolinite, montmorillonite, etc.), glass powder, glass flakes, glass fibers, calcium sulfate, etc.

The above additives should preferably be used in an amount of up to 25% by weight based on the total weight of the polymer matrix, low-molecular organic compound and conductive particles.

The organic PTC thermistor according to the invention has a low initial resistance in its non-operating state, typically a room-temperature resistivity of about $10^{-3}$ to $10^{-1}$ Ω-cm, and experiences a sharp resistance rise during operation so that the rate of resistance change upon transition from its non-operating state to operating state may be 6 orders of magnitude or greater.

Referring to FIG. 1, there is illustrated one exemplary construction of the organic PTC thermistor according to the invention. The thermistor includes a thermistor body 2 comprised of at least the thermoplastic polymer matrix, thermoplastic elastomer, low-molecular organic compound and conductive particles, which is sandwiched between a pair of electrodes 3. The FIGURE illustrates one exemplary elevational cross-sectional shape of the thermistor and various changes may be made thereon without departing from the scope of the invention. The planar shape of the thermistor may be circular, tetragonal or other suitable shape, depending on the required characteristics and specifications.

EXAMPLE

Examples of the invention are given below by way of illustration and not by way of limitation.

Example 1

Linear low-density polyethylene (UJ960 by Nippon Polychem Co., Ltd. with an MFR of 5.0 g/10 min. at 190° C. and 2.16 kg load, a density of 0.935 g/cm$^3$, and a melting point of 135° C.) and a thermoplastic olefin elastomer (Milastomer 6030N by Mitsui Chemical Co., Ltd. with an MFR of 50 g/10 min. at 230° C. and 10 kg load, a density of 0.890 g/cm$^3$, and a melting point of 165° C.) were used as the polymer matrix. The low-molecular organic compound used was paraffin wax (HNP-10 by Nippon Seiro Co., Ltd. with a melting point of 75° C.). The conductive particles used was filamentary nickel powder (Type 255 Nickel Powder by INCO Ltd.) which had an average particle diameter of 2.2 to 2.8 μm, an apparent density of 0.5 to 0.65 g/cm$^3$, and a specific surface area of 0.68 m$^2$/g. The weight ratio of polyethylene: thermoplastic elastomer: paraffin wax was 5:2:3. The amount of the nickel powder was 6 times the total weight of the polyethylene, thermoplastic elastomer and paraffin wax. They were mixed in a mill at 150° C. for 15 minutes.

The milled mixture was pressed at 150° C. into a sheet of 0.7 mm thick by means of a heat pressing machine. The sheet on opposite surfaces was sandwiched between a pair of Ni foil electrodes of about 30 μm thick. The assembly was heat pressed at 150° C. to a total thickness of 0.4 mm by means of a heat press. The sheet was then punched into a disk of 10 mm in diameter to obtain an organic PTC thermistor device, a section of which is shown in FIG. 1.

The device was heated and cooled between room temperature (25° C.) and 120° C. at a rate of 2° C./min in a thermostat. A resistance value was measured at a predetermined temperature by the four-terminal method. The initial room-temperature resistance was $5.8 \times 10^{-3}$ Ω. the resistance started to increase at about 70° C., and the resistance change was of 7 orders of magnitude. It was confirmed that a low room-temperature resistance and a large resistance change were attained at the same time.

The device was subjected to a thermal shock or thermal cyclic test in which one cycle consists of 30 minutes of cooling at −40° C. and 30 minutes of heating at 85° C. The room-temperature resistance at the end of 15 cycles was $1.8 \times 10^{-2}$ Ω, indicating a little change from the initial.

The device was also subjected to a hot humid reliability test by holding at 65° C. and RH 95% for 1,000 hours. The room-temperature resistance after the test was $6.4 \times 10^{-3}$ Ω, indicating a little change from the initial.

Example 2

Polystyrene (HH102 by Mitsubishi Chemical Co., Ltd. with an MFR of 3.0 g/10 min. at 200° C. and 5 kg load, a density of 1.05 g/cm$^3$) and a thermoplastic styrene elastomer (Kraton G1657 by Shell with an MFR of 9 g/10 min. at 230° C. and 2.16 kg load, a density of 0.900 g/cm$^3$) were used as the polymer matrix. The low-molecular organic compound used was paraffin wax (HNP-10 by Nippon Seiro Co., Ltd. with a melting point of 75° C.). The conductive particles used was filamentary nickel powder (Type 255 Nickel Powder by INCO Ltd.) which had an average particle diameter of 2.2 to 2.8 μm, an apparent density of 0.5 to 0.65 g/cm$^3$, and a specific surface area of 0.68 m$^2$/g. The weight ratio of polystyrene: thermoplastic elastomer: paraffin wax was 2:4:4. The amount of the nickel powder was 6 times the total weight of the polystyrene, thermoplastic elastomer and paraffin wax. They were mixed in a mill at 150° C. for 15 minutes.

The milled mixture was molded at 150° C. into a sheet, from which an organic PTC thermistor device was fabricated as in Example 1.

The initial room-temperature resistance was $4.5 \times 10^{-3}$ Ω, the resistance started to increase at about 70° C., and the resistance change was of 10 orders of magnitude.

The device was subjected to a thermal shock or thermal cyclic test as in Example 1. The room-temperature resistance at the end of 50 cycles was $1.9 \times 10^{-2}$ Ω, indicating a little change from the initial.

The device was also subjected to a hot humid reliability test as in Example 1. The room-temperature resistance after 1,000 hours of holding was $5.4 \times 10^{-3}$ Ω, indicating a little change from the initial.

Example 3

The thermosetting polymer used was a mixture of 20 g of bisphenol A type epoxy resin (Epikote 801 by Yuka Shell Co., Ltd.) and 10 g of a modified amine curing agent (Epomate B002 by Yuka Shell Co., Ltd.). The thermoplastic elastomer used was a thermoplastic olefin elastomer (Milastomer 6030N by Mitsui Chemical Co., Ltd. with an MFR of 50 g/10 min. at 230° C. and 10 kg load). The low-molecular organic compound used was paraffin wax (HNP-10 by Nippon Seiro Co., Ltd. with a melting point of 75° C.). The conductive particles used was filamentary nickel powder (Type 255 Nickel Powder by INCO Ltd.) which had an average particle diameter of 2.2 to 2.8 μm, an apparent density of 0.5 to 0.65 g/cm$^3$, and a specific surface area of 0.68 m$^2$/g. Using a centrifugal dispersing machine, 20 g of bisphenol A type epoxy resin, 10 g of the modified amine curing agent, 8 g of thermoplastic olefin elastomer, and 12 g of paraffin wax were mixed in 30 ml of toluene for 10 minutes.

The resulting paint-like mixture was coated onto one surface of a nickel foil electrode of about 30 μm thick, and another electrode was rested on the coating or sheet. The sandwich was disposed between spacers so as to give a thickness of 0.4 mm, which was placed between a pair of brass plates. While the assembly was compressed by a heat press, the sheet was heat cured at 80° C. for 3 hours. The cured sheet with the electrodes heat bonded thereto was punched into a disk of 10 mm in diameter, obtaining an organic PTC thermistor device.

The initial room-temperature resistance was $7.2 \times 10^{-3}$ Ω. the resistance started to increase at about 70° C., and the resistance change was of 7 orders of magnitude.

The device was subjected to a thermal shock or thermal cyclic test as in Example 1. The room-temperature resistance at the end of 50 cycles was $1.7 \times 10^{-2}$ Ω, indicating a little change from the initial.

The device was also subjected to a hot humid reliability test as in Example 1. The room-temperature resistance after 1,000 hours of holding was $8.3 \times 10^{-3}$ Ω, indicating a little change from the initial.

Example 4

Linear low-density polyethylene (UJ960 by Nippon Polychem Co., Ltd. with an MFR of 5.0 g/10 min. at 190° C. and 2.16 kg load, a density of 0.935 g/cm$^3$, and a melting point of 135° C.) and a thermoplastic olefin elastomer (Milastomer M4800N by Mitsui Chemical Co., Ltd. with an MFR of 25 g/10 min. at 230° C. and 2.16 kg load, a density of 0.890 g/cm$^3$, and a melting point of 165° C.) were used as the polymer matrix. The low-molecular organic compound used was paraffin wax (PolyWax 500 by Baker Petrolite Co. with a melting point of 88° C.). The conductive particles used was filamentary nickel powder (Type 210

Nickel Powder by INCO Ltd.) which had an average particle diameter of 0.5 to 1.0 µm, an apparent density of 0.8 g/cm$^3$, and a specific surface area of 1.5 to 2.5 m$^2$/g. The weight ratio of polyethylene: thermoplastic elastomer: paraffin wax was 6:2:2. The amount of the nickel powder was 6 times the total weight of the polyethylene, thermoplastic elastomer and paraffin wax. They were mixed in a mill at 150° C. for 30 minutes.

The milled mixture was molded at 150° C. into a sheet, from which an organic PTC thermistor device was fabricated as in Example 1.

The initial room-temperature resistance was 3.8×10$^{-3}$ Ω, the resistance started to increase at about 85° C., and the resistance change was of 6 orders of magnitude.

The device was subjected to a thermal shock or thermal cyclic test as in Example 1. The room-temperature resistance at the end of 100 cycles was 5.0×10$^{-3}$Ω, indicating little change from the initial.

The device was also subjected to a hot humid reliability test as in Example 1. The room-temperature resistance after 1,000 hours of holding was 5.4×10$^{-3}$ Ω, indicating little change from the initial.

Comparative Example 1

For comparison purposes, a thermistor device was fabricated in which the matrix consisted of a single polymer and did not contain a thermoplastic elastomer. Straight-chain, low density polyethylene (UJ960 by Nipon Polychem Co., Ltd. with an MFR of 5.0 g/10 min. at 190° C. and 2.16 kg load, and a melting point of 135° C.) was used as the polymer matrix. The low-molecular organic compound used was paraffin wax (HNP-10 by Nippon Seiro Co., Ltd. with a melting point of 75° C.). The conductive particles used was filamentary nickel powder (Type 255 Nickel Powder by INCO Ltd.) which had an average particle diameter of 2.2 to 2.8 µm, an apparent density of 0.5 to 0.65 g/cm$^3$, and a specific surface area of 0.68 m$^2$/g. The weight ratio of low-density polyethylene : paraffin wax was 5:5. The amount of the nickel powder was 6 times the total weight of the polyethylene and paraffin wax. They were mixed in a mill at 150° C. for 30 minutes.

The initial room-temperature resistance was 2.5×10$^{-3}$ Ω, the resistance started to rapidly increase at about 75° C., and the resistance change was of 9 orders of magnitude.

The device was subjected to a thermal shock or thermal cyclic test as in Example 1. The room-temperature resistance was 1.7×10$^7$ Ω even at the end of 10 cycles, indicating a marked increase of resistance.

The device was also subjected to a hot humid reliability test as in Example 1. The room-temperature resistance after 1,000 hours of holding was 3.0×10$^1$ Ω, also indicating a marked increase of resistance.

Comparative Example 2

Low density polyethylene (LC500 by Nipon Polychem Co., Ltd. with an MFR of 4.0 g/10 min. at 190° C. and 2.16 kg load, and a melting point of 106° C.) was used as the polymer matrix. The low-molecular organic compound used was paraffin wax (HNP-10 by Nippon Seiro Co., Ltd. with a melting point of 75° C.). The conductive particles used was filamentary nickel powder (Type 255 Nickel Powder by INCO Ltd.) which had an average particle diameter of 2.2 to 2.8 µm, an apparent density of 0.5 to 0.65 g/cm$^3$, and a specific surface area of 0.68 m$^2$/g. The weight ratio of low-density polyethylene: paraffin wax was 6:4. The amount of the nickel powder was 6 times the total weight of the polyethylene and paraffin wax. They were mixed in a mill at 150° C. for 30 minutes.

The initial room-temperature resistance was 1.9×10$^{-3}$ Ω, the resistance started to rapidly increase at about 75° C., and the resistance change was of 11 orders of magnitude or greater.

The device was subjected to a thermal shock or thermal cyclic test as in Example 1. The room-temperature resistance was 4.2×10$^6$ Ω even at the end of 10 cycles, indicating a marked increase of resistance.

The device was also subjected to a hot humid reliability test as in Example 1. The room-temperature resistance after 1,000 hours of holding was 6.2×10$^3$ Ω, also indicating a marked increase of resistance.

The effectiveness of the invention is evident from these comparative data.

There has been described an organic PTC thermistor which is improved in reliability and performance stability.

What is claimed is:

1. An organic positive temperature coefficient thermistor comprising
   a matrix including at least two polymers, where at least one of the at least two polymers is a thermoplastic elastomer;
   a low-molecular weight organic compound selected from the group consisting a wax, a fat and an oil; and
   conductive particles having spiky protuberances.

2. The organic positive temperature coefficient thermistor of claim 1, wherein said matrix contains 2 to 60% by weight of the thermoplastic elastomer.

3. The organic positive temperature coefficient thermistor of claim 1, wherein said low-molecular weight organic compound has a melting point in a range of from 40° C. to 200° C.

4. The organic positive temperature coefficient thermistor of claim 1, wherein said conductive particles having spiky protuberances are interconnected in chain-like network.

5. The organic positive temperature coefficient thermistor of claim 1, wherein said low-molecular weight organic compound is segregated in said matrix.

6. The organic positive temperature coefficient thermistor of claim 1, which constitutes a protective circuit device for a secondary battery.

7. The organic positive temperature coefficient thermistor of claim 1, wherein each of said at least two polymers has a melting point higher than a melting point of the low-molecular weight organic compound.

8. The organic positive temperature coefficient thermistor of claim 1, wherein said at least two polymers comprise a thermoplastic polymer and a thermosetting polymer.

9. The organic positive temperature coefficient thermistor of claim 1, wherein said thermoplastic elastomer has a melting point at least 10° C. higher than a melting point of the low-molecular weight organic compound.

10. The organic positive temperature coefficient thermistor of claim 1, wherein said thermoplastic elastomer has a melting point in a range of from 100° C. to 180° C.

11. The organic positive temperature coefficient thermistor of claim 1, wherein said matrix contains 5% to 40% by weight of the thermoplastic elastomer.

12. The organic positive temperature coefficient thermistor of claim 1, wherein said low-molecular weight organic compound has a melting point in a range of from 40° C. to 100° C.

13. The organic positive temperature coefficient thermistor of claim 1, wherein said low-molecular weight organic compound comprises a petroleum wax.

14. The organic positive temperature coefficient thermistor of claim 1, wherein each of said conductive particles comprises from 10 to 500 spiky protuberances each having a height in a range of from 1/3 to 1/50 of a conductive particle diameter.

15. A method of making a positive temperature coefficient thermistor, the method comprising mixing at least two polymers, a low-molecular weight organic compound, and conductive particles; and producing the thermistor of claim 1.

* * * * *